US005820996A

United States Patent [19]

Hirai et al.

[11] Patent Number: 5,820,996

[45] Date of Patent: Oct. 13, 1998

[54] ELECTROLUMINESCENCE DEVICE AND METHOD OF MANUFACTURING SAME

[75] Inventors: Masaaki Hirai, Tenri; Noriaki Nakamura, Yamabe-gun, both of Japan

[73] Assignee: Sharp Kabushiki Kaisha, Osaka, Japan

[21] Appl. No.: 780,177

[22] Filed: Dec. 26, 1996

[30] Foreign Application Priority Data

Jan. 31, 1996 [JP] Japan .................................... 8-015069

[51] Int. Cl.[6] ...................................................... B32B 15/04

[52] U.S. Cl. .......................... 428/469; 313/503; 313/504; 313/506; 313/509; 428/689; 428/690; 428/697; 428/699; 428/701; 428/702; 428/917

[58] Field of Search ..................................... 428/689, 690, 428/469, 697, 699, 701, 702, 917; 313/503, 504, 506, 509

[56] References Cited

U.S. PATENT DOCUMENTS

| | | | |
|---|---|---|---|
| 5,543,237 | 8/1996 | Watanabe | 428/702 |
| 5,648,181 | 7/1997 | Watanabe | 428/690 |

FOREIGN PATENT DOCUMENTS

| | | |
|---|---|---|
| 50-33786 | 4/1975 | Japan . |
| A-50-33786 | 4/1975 | Japan . |
| B2-58-20468 | 4/1983 | Japan . |
| 58-25270 | 5/1983 | Japan . |
| B2-58-25270 | 5/1983 | Japan . |
| 58-27506 | 6/1983 | Japan . |
| B2-58-27506 | 6/1983 | Japan . |
| 58-35360 | 8/1983 | Japan . |
| B2-58-35360 | 8/1983 | Japan . |
| 58-55508 | 12/1983 | Japan . |
| B2-58-55508 | 12/1983 | Japan . |
| 58-20468 | 4/1985 | Japan . |
| 60-16078 | 4/1985 | Japan . |
| 69-16077 | 4/1985 | Japan . |
| B2-60-16077 | 4/1985 | Japan . |
| B2-60-16078 | 4/1985 | Japan . |
| 61-211997 | 9/1986 | Japan . |
| A-61-211997 | 9/1986 | Japan . |
| 63-15719 | 4/1988 | Japan . |
| B2-63-15719 | 4/1988 | Japan . |
| 0 493975 A | 12/1991 | Japan . |
| 05 121171 A | 5/1993 | Japan . |
| 05 315076 A | 11/1993 | Japan . |

OTHER PUBLICATIONS

Patent Abstracts of Japan, vol. 017, No. 480 (E–1425), 31 Aug. 1993.

Patent Abstracts of Japan, vol. 018, No. 116 (E–1515), 24 Feb. 1994.

*Primary Examiner*—John M. Cooney, Jr.
*Attorney, Agent, or Firm*—Nixon & Vanderhye P.C.

[57] ABSTRACT

An object of the invention is to provide an EL device which is capable of preventing reflection of external light or ambient light and displaying with a high contrast. By using a laminated film composed of a Cr metal film 6*b* and a $Cr_2O_{3-x}$ film 6*a* which is an oxide film of Cr, or a Mo metal film 16*b* and a $MoO_{3-x}$ film 16*a* which is an oxide film of Mo, which are laminated as a rear electrode 6 of the EL device, light absorbing effect in the rear electrode 6 is increased and the reflection of external light or ambient light is suppressed thereby improving the contrast.

12 Claims, 5 Drawing Sheets

ELECTROLUMINESCENCE DEVICE AND METHOD OF MANUFACTURING SAME

BACKGROUND OF THE INVENTION

1. Field of the invention

The present invention relates to an electroluminescence device (hereinafter referred to as an EL device) used as a display apparatus of office automation or factory automation equipment and to a method of manufacturing the same.

2. Description of The Related Art

As an EL device used for the display unit of office automation or factory automation equipment, there is known an EL device having a 3-layer construction as shown in FIG. 7. FIG. 8 shows a sectional view of an EL device of the prior art.

As shown in FIG. 8, the EL device of the prior art is made by forming a pattern of parallel strips of transparent electrodes 22 spaced from each other made of ITO (indium tin oxide) on a transparent substrate 21 made of glass, whereon a first insulation film 23 made of an oxide such as $Al_2O_3$, $SiO_2$ and $TiO_2$, or a nitride such as $Si_3N_4$, a luminescent layer 24 having such a composition that a trace of Mn or the like is added as a luminescence center to a host material of ZnS, ZnSe, SrS or the like, and a second insulation film 25 made of the oxide or the nitride are formed in this order, then forming thereon rear electrodes 26 in a pattern of parallel strips made of Al spaced from each other in a direction intersecting the transparent electrodes 22 at right angles. The transparent electrodes 22 are provided with terminal electrodes 27 formed for the input of driving signals.

The EL device thus manufactured is capable of giving dot matrix display as desired by selectively applying a voltage to the transparent electrodes 22 and the rear electrodes 26, thereby causing the luminescence layer 24 at the intersect of the electrodes 22 and 26 to emit light in dot in a desired combination.

The reason for using Al as the rear electrode in the prior art is as follows.

Because the rear electrodes of the EL device are extended alternately to the opposite sides as shown in FIG. 9, the luminance of the electrode line decreases at the tip than at the base portion thereof due to the electrical resistance of the electrode, causing such an unevenness in luminance as the successive lines appear bright and dark alternately and resulting in poor display quality. In order to make such an unevenness in luminance visually insignificant, it is necessary to maintain the luminance difference between adjacent lines of 10% or less. FIG. 10 shows the sheet resistivity of the rear electrode and the decreasing rate of luminance at the tip of the rear electrode compared to the base portion. This figure shows that a sheet resistivity of the rear electrode of 0.5 Ω/□ or less must be kept to make the unevenness in luminance visually insignificant. For this reason, a metal having a low specific resistance has been used for the rear electrode. The sheet resistivity mentioned herein refers to a value obtained by dividing the specific resistance (Ω·cm) which is intrinsic of the material by film thickness (cm).

In the EL device of the construction described above, the first and the second insulation films 23 and 25 and the luminescent layer 24 have high degrees of transparency and Al used in the rear electrodes 26 has a high reflectivity. Therefore, when external light or ambient light enters, the rear electrodes 26 reflect it, and thereby the contrast ratio between the luminescent portion and non-luminescent portion is decreased. Particularly in a bright place such as outdoors, the decrease in contrast ratio becomes significant and impairs the display quality of the display apparatus. For example, in an experiment conducted by the present inventors, a contrast ratio of scant 12:1 was obtained right below an illumination of 500 lx.

Therefore, in order to suppress the reflection of external light or ambient light and improve the contrast ratio, such means have been implemented as installing a filter of a smoked color in front of the display device to decrease the light transmission ratio or installing a circular polarization filter which has an effect of cutting off metallic reflection.

Japanese Examined Patent Publication JP-B2 63-15719 (1988) discloses a method for suppressing the reflection of external light or ambient light by the rear electrode 26 by making the rear electrodes 26 of a material having a high light absorbing coefficient such as molybdenum disulfide or molybdenite. Japanese Examined Patent Publication JP-B2 60-16077 (1985) discloses another method for suppressing the reflection of external light or ambient light by the rear electrodes 26 by forming the rear electrodes 26 through lamination of a material having a high light absorbing coefficient such as molybdenum disulfide or molybdenite and Al metal film.

Japanese Examined Patent Publication JP-B2 60-16078 (1985) also discloses another method for suppressing the reflection of external light or ambient light by the rear electrodes 26 by forming a blackened film of a material such as PbTe, PbSe, HgTe, HgSe, Si and Ge between the EL layer and the rear electrodes, and forming a black background film made of a black-colored resin on further back side of the rear electrodes.

Japanese Examined Patent Publication JP-B2 58-20468 (1983), Japanese Examined Patent Publication JP-B2 58-25270 (1983) and Japanese Examined Patent Publication JP-B2 58-27506 (1983) disclose a method for suppressing the reflection of external light or ambient light by forming $Al_2O_{3-x}$ layer between the EL layer and the rear electrodes.

However there has been such a problem that, among the prior arts mentioned above, molybdenum disulfide, molybdenite and the blackened film of PbTe, PbSe, HgTe, HgSe, Si, Ge or the like can be obtained in black color as simple substance, although these substances have high values of specific resistance which make film thickness of at least 1 μm necessary to achieve the required value of sheet resistivity, resulting in higher material cost and processing cost for forming the films. Use of molybdenum disulfide, in particular, requires the use of toxic gas such as $H_2S$ when forming the film.

Moreover, when $Al_2O_{3-x}$ is formed between the EL layer and the rear electrode, a contrast ratio of only 22:1 was obtained right below an illumination of 500 lx in an experiment conducted by the present inventors. This is because the Al thin film can be very easily oxidized and therefore it is difficult to control the degree of oxidization, resulting in instability of the light absorption spectrum which makes it difficult to obtain uniform blackness (color tone) of the film with good reproducibility. Also sufficient suppression of the external light or ambient light requires it to make the multi-layer construction of the $Al_2O_{3-x}$ film and Al metal film in five or more layers, giving rise to a problem of taking a long time in forming the film and higher cost.

As described above, when blackening the rear electrode with the prior art, it has been difficult to achieve uniform degree of blackening with good reproducibility at a low cost.

Among the prior arts mentioned above, the method of installing the filter of smoked color or the circular polarization filter over the entire EL device makes it possible to obtain a contrast ratio of 48:1 right below an illumination of 500 lx in an experiment conducted by the present inventors, but fails to give a clear display because light is observed to infiltrate from the luminescent portion to the non-luminescent portion, and cannot be said to be an optimum method for improving the contrast.

SUMMARY OF THE INVENTION

Hence, in consideration of the problems described above, an object of the invention is to provide an EL device of high contrast at a low cost by uniformly increasing the light absorption ratio of rear electrodes. Another object of the invention is to provide a method of manufacturing such an EL device.

The present invention provides an EL device which emits light by applying a predetermined-level voltage, the device comprising:

transparent electrodes, rear electrodes, and a luminescent layer to which the predetermined-level voltage is applied, interposed between the transparent electrodes and the rear electrodes, wherein as the rear electrodes is used a laminated film composed of a Cr oxide film and a Cr metal film which are laminated in this order from the luminescent layer side.

The invention is characterized in that a metal film of Al, Ni, Mo or the like having a lower electric resistance than that of the Cr metal film is further laminated on the Cr metal film used as the rear electrodes to reduce the sheet resistivity of the rear electrode to 0.5 Ω/□ or less.

The present invention also provides an EL device which emits light by applying a predetermined-level voltage, the device comprising:

transparent electrodes, rear electrodes, and a luminescent layer to which the predetermined-level voltage is applied, interposed between the transparent electrodes and the rear electrodes, wherein as the rear electrodes is used a laminated film composed of a Cr oxide film and a metal film of Al, Ni, Mo or the like which are laminated in this order from the luminescent layer side.

The present invention also provides an EL device which emits light by applying a predetermined-level voltage, the device comprising:

transparent electrodes, rear electrodes, and a luminescent layer to which the predetermined-level voltage is applied, interposed between the transparent. electrodes and the rear electrodes, wherein as the rear electrodes is used a laminated film composed of a Mo oxide film and a metal film of Mo which are laminated in this order from the luminescent layer side.

The invention is characterized in that a metal film of Al or the like having a lower electric resistance than that of the metal film of Mo is further laminated on the metal film of Mo used as the rear electrode to reduce the sheet resistivity of the rear electrode to 0.5 Ω/□ or less.

The present invention also provides an EL device which emits light by applying a predetermined-level voltage, the device comprising:

transparent electrodes, rear electrodes, and a luminescent layer to which the predetermined-level voltage is applied, interposed between the transparent electrodes and the rear electrodes, wherein as the rear electrodes is used a laminated film composed of a Mo oxide film and a metal film of Al or the like which are laminated in this order from the luminescent layer side.

The present invention provides a method of manufacturing an EL device comprising the steps of:

forming a first insulation film, an EL layer and a second insulation film on a transparent substrate;

forming a metal oxide film made of an oxide of Cr or Mo on the second insulation film;

forming a first metal film made of Cr or Mo on the metal oxide film;

forming a second metal film made of Al, Ni, Mo or the like on the first metal film;

spreading a resist on the second metal film to form a pattern of the resist;

patterning the second metal film by using the resist pattern; and patterning the first metal film and the metal oxide film by similarly using the resist pattern.

The invention provides a method of manufacturing an EL device comprising the steps of:

forming a first insulation film, an EL layer and a second insulation film on a transparent substrate;

forming a metal oxide film made of an oxide of Cr or Mo on the second insulation film;

forming a metal film made of Al, Ni, Mo or the like on the metal oxide film;

spreading a resist on the metal film to form a pattern of the resist;

patterning the metal film by using the resist pattern; and patterning the metal oxide film by similarly using the resist pattern.

Now the operations of the above configurations will be described below.

According to the invention, the EL device which emits light by applying a predetermined-level voltage to the luminescent layer interposed between the transparent electrodes and the rear electrodes is capable of suppressing the reflection of external light or ambient light by using the laminated film comprising the Cr-oxide film and the Cr metal film laminated in this order from the luminescent layer side as the rear electrodes.

It is also made possible to suppress the reflection of external light or ambient light and reducing the unevenness of display by further laminating the metal film of Al, Ni, Mo or the like having a lower electric resistance than that of the Cr metal film on the Cr metal film which is used as the rear electrode, thereby to reduce the sheet resistivity of the rear electrode to 0.5 Ω/□ or less.

Also according to the invention, the EL device which emits light by applying a predetermined-level voltage to the luminescent layer interposed between the transparent electrodes and the rear electrodes is capable of suppressing the reflection of external light or ambient light and reducing the unevenness of display using the laminated film comprising the Cr-oxide film and the metal film of Al, Ni, Mo or the like laminated in this order from the luminescent layer side as the rear electrodes.

Also according to the invention, the EL device which emits light by applying a predetermined-level voltage to the luminescent layer interposed between the transparent electrodes and the rear electrodes is capable of suppressing the reflection of external light or ambient light by using the laminated film comprising the Mo oxide film and the Mo metal film laminated in this order from the luminescent layer side as the rear electrodes.

It is also made possible to suppress the reflection of external light or ambient light and reducing the unevenness of display by laminating the metal film of Al or the like having a lower electric resistance than that of the Mo metal film on further back side of the Mo metal film used as the rear electrode, thereby to reduce the sheet resistivity of the rear electrode to 0.5 Ω/□ or less.

Also according to the invention, the EL device which emits light by applying a predetermined-level voltage to the luminescent layer interposed between the transparent electrode and the rear electrode is capable of suppressing the reflection of external light or ambient light and reducing the unevenness of display by using the laminated film comprising the Mo oxide film and the metal film of Al or the like laminated in this order from the luminescent layer side as the rear electrodes.

According to the EL device manufacturing method of the invention comprising the process of forming the first insulation film, the EL layer and the second insulation film on the transparent substrate, the process of forming the metal oxide film made of the oxide of Cr or Mo on the second insulation film, the process of forming the first metal film made of Cr or Mo on the metal oxide film, the process of forming the second metal film made of Al, Ni, Mo or the like on the first metal film, the process of spreading the resist on the second metal film to form the pattern of the resist, the process of patterning the second metal film by using the resist pattern, and the process of patterning the first metal film and the metal oxide film by using the resist pattern similarly to the above, the manufacturing process can be simplified because the same resist pattern is used in patterning the rear electrodes obtained by laminating different metals.

Also according to the EL device manufacturing method of the invention comprising the process of forming the first insulation film, the EL layer and the second insulation film on the transparent substrate, the process of forming the metal oxide film made of the oxide of Cr or Mo on the second insulation film, the process of forming the metal film made of Al, Ni or the like on the metal oxide film, the process of spreading the resist on the metal film to form the pattern of the resist, the process of patterning the metal film by using the resist pattern, and the process of patterning the metal oxide film by using the resist pattern similarly to the above, the manufacturing process can be simplified because the same resist pattern is used in patterning the rear electrodes obtained by laminating different metals.

As described above, the EL device of the invention which emits light by applying a predetermined-level voltage to the luminescent layer interposed between the transparent electrodes and the rear electrodes has the effects of suppressing the reflection of external light or ambient light and improving the contrast by using the laminated film comprising the Cr oxide film and the Cr metal film laminated in this order from the luminescent layer side as the rear electrodes.

Further the invention has the effects of suppressing the reflection of external light or ambient light, improving the contrast and reducing unevenness of display by further laminating the metal film of Al, Ni, Mo or the like having a lower electric resistance than that of the Cr metal film on the Cr metal film used as the rear electrode, thereby reducing the sheet resistivity of the rear electrode to 0.5 Ω/□ or less.

Also according to the EL device of the invention which emits light by applying a predetermined-level voltage to the luminescent layer interposed between the transparent electrodes and the rear electrodes, such effects are provided as suppressing the reflection of external light or ambient light, improving the contrast and reducing unevenness of display by using the laminated film comprising the Cr oxide film and the metal film of Al, Ni or the like laminated in this order from the luminescent layer side as the rear electrodes. Also because the rear electrodes are formed in two layers, it is also possible to make the rear electrodes blackened and reduce the resistance thereof in a simple construction and to cut down the manufacturing cost.

Also according to the EL device of the invention which emits light by applying a predetermined-level voltage to the luminescent layer interposed between the transparent electrode and the rear electrode, such effects are provided as suppressing the reflection of external light or ambient light and improving the contrast by using the laminated film comprising the Mo oxide film and the Mo metal film laminated in this order from the luminescent layer side as the rear electrodes.

Further the invention has the effects of suppressing the reflection of external light or ambient light, improving the contrast and reducing unevenness of display by further laminating the metal film of Al or the like having a lower electric resistance than that of the Mo metal film on the Mo metal film used as the rear electrodes, thereby reducing the sheet resistivity of the rear electrode to 0.5 Ω/□ or less.

Also according to the EL device of the invention which emits light by applying a predetermined-level voltage to the luminescent layer interposed between the transparent electrode and the rear electrode, such effects are provided as suppressing the reflection of external light or ambient light, improving the contrast and reducing unevenness of display by using the laminated film comprising the Mo oxide film and the metal film of Al or the like laminated in this order from the luminescent layer side as the rear electrode. Because the rear electrode is formed in two layers, it is also possible to make the rear electrodes blackened and reduce the resistance thereof in a simple construction and to cut down the manufacturing cost.

According to the EL device manufacturing method of the invention comprising a process of forming the first insulation film, the EL layer and the second insulation film on the transparent substrate, the process of forming the metal oxide film made of the oxide of Cr or Mo on the second insulation film, the process of forming the first metal film made of Cr or Mo on the metal oxide film, the process of forming the second metal film made of Al, Ni, Mo or the like on the first metal film, the process of spreading the resist on the second metal film to form the pattern of the resist, the process of patterning the second metal film by using the resist pattern, and the process of patterning the first metal film and the metal oxide film by using the resist pattern similarly to the above, the effect of simplifying the manufacturing process is provided because the same resist pattern is used in patterning the rear electrodes obtained by laminating different metals.

Also according to the EL device manufacturing method of the invention comprising the process of forming the first insulation film, the EL layer and the second insulation film on the transparent substrate, the process of forming the metal oxide film made of the oxide of Cr or Mo on the second insulation film, the process of forming the metal film made of Al, Ni or the like on the metal oxide film, the process of spreading the resist on the metal film to form the pattern of the resist, the process of patterning the metal film by using the resist pattern, and the process of patterning the metal oxide film by using the resist pattern similarly to the above, the effect of simplifying the manufacturing process is provided because the same resist pattern is used in the patterning of the rear electrodes obtained by laminating different metals.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
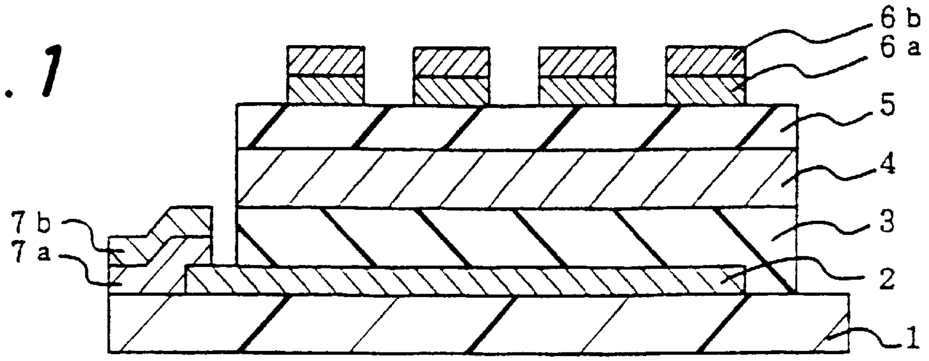
FIG. 1 is a view showing a first embodiment of the invention.

Now referring to the drawings, preferred embodiments of the invention are described below.

(First embodiment)

The first embodiment of the invention will be described below with reference to FIG. 1.

FIG. 1 shows a cross sectional view of an EL device of the invention. Reference numeral 1 denotes a transparent substrate, reference numeral 2 a transparent electrode, reference numeral 3 a first insulation film, reference numeral 4 a luminescent layer, reference numeral 5 a second insulation film, reference numeral 6 rear electrodes and reference numeral 7 terminal electrodes. A method of manufacturing the EL device will be described below.

A pattern of parallel strips of transparent electrodes 2 spaced from each other made of ITO (indium tin oxide) is formed on a transparent substrate 1 made of glass or the like. A first insulation film 3 made of an oxide such as $Al_2O_3$, $SiO_2$ and $TiO_2$ or a nitride such as $Si_3N_4$, a luminescent layer 4 having such a constitution as a trace of Mn or the like is added as a luminescence center to a base material comprising ZnS, ZnSe, SrS or the like, and a second insulation film 5 made of the oxide or the nitride are formed in this order over the transparent electrodes 2. Then a Cr oxide film 6*a* which serves as a light absorption film is formed thereon with a thickness of 0.02 to 0.07 μm, or more preferably 0.040 to 0.045 μm. The Cr oxide film 6*a* is formed by sputtering a target of metal Cr with Ar gas including oxygen ($O_2$) mixed therein, thereby to let Cr and O react, while the concentration of oxygen mixed in Ar gas is set to a level lower than the minimum oxygen concentration required for Cr to be completely oxidized and turn to $Cr_2O_3$, so that part of Cr is oxidized in oxygen-deplete atmosphere and turns to $Cr_2O_{3-x}$. Further over this layer, a metal Cr film 6*b* is formed with a thickness of 0.1 to 0.5 μm. Over these electrode films, a photoresist pattern for the rear electrodes 6 and a photoresist pattern for the terminal electrodes 7 are formed in a form of parallel strips spaced from each other in a direction intersecting the transparent electrodes 2 at right angles. Then the Cr metal film 6*b* and the Cr oxide film 6*a* are etched with a mixture liquid of cerium diammonium nitrate: perchloric acid (3:1) to turn to the rear electrodes 6 and the terminal electrodes 7.

With the EL device of this embodiment, because the Cr metal film 6*b* and the $Cr_2O_{3-x}$ film 6*a*, an oxide film of Cr, are used as the rear electrodes 6 which makes it easier to control the degree of oxidization than forming an Al oxide film, light absorbing effect was easily obtained. Also a contrast ratio of 68:1 was obtained right below an illumination of 500 lx.

(Second embodiment)

Figure 2:
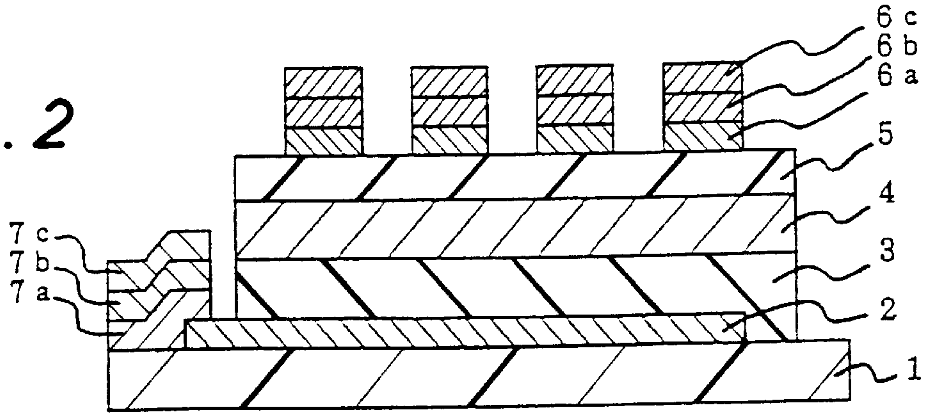
FIG. 2 is a view showing a second embodiment of the invention.

FIG. 2 shows the construction of the second embodiment of the invention, which is almost identical with the construction of the first embodiment, except for a Ni film 6*c* of thickness from 0.1 to 0.5 μm provided over the Cr film 6*b* among the rear electrodes 6. This is for the purpose of reducing the resistance of the rear electrode because Cr has a specific resistance of $17.0\times10^{-6}\Omega\cdot cm$, a high value for a metal used as electrode material.

Similar effect can also be achieved by laminating metal films of low resistance such as Al film or Mo film with a thickness of 0.1 to 0.5 μm, instead of the Ni film.

Over these electrode films, a photoresist pattern is formed in the form of parallel strips spaced from each other in a direction of intersecting the transparent electrodes 2 at right angles. After etching the Ni metal film with a mixture liquid of phosphoric acid: nitric acid (2:1) and rinsing, the Cr metal film 6b and the Cr oxide film 6*a* are etched continuously with a mixture liquid of cerium diammonium nitrate: perchloric acid (3:1) to turn to the back electrodes 6. By using the photoresist pattern in the patterning of the Cr metal film 6*b* and the Cr oxide film 6*a* without removing it after etching the Ni metal film 6*c*, the manufacturing process can be simplified.

With the EL device of this embodiment, because the Cr metal film 6*b* and the $Cr_2O_{3-x}$ film 6*a*, an oxide film of Cr, are used as the rear electrodes which makes it easier to control the degree of oxidization than forming an Al oxide film, light absorbing effect was easily obtained. Also a contrast ratio of 50:1 or higher was obtained right below an illumination of 500 lx.

Also because the Ni metal film 6*c* is provided on further back side of the Cr metal film 6*b*, sheet resistivity of the rear electrode is reduced to 0.5 Ω/□ or less, thus reducing unevenness of display.

(Third embodiment)

Figure 3:
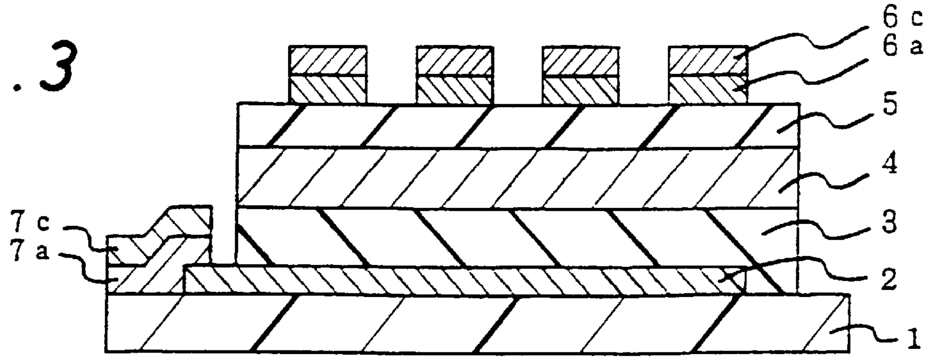
FIG. 3 is a view showing a third embodiment of the invention.

FIG. 3 shows the construction of the third embodiment of the invention, which is almost identical with the construction of the second embodiment, except that the Cr film 6*b* among the rear electrodes 6 is omitted and the Ni film 6*c* is formed directly on the Cr oxide film 6*a*.

In the following description, similar effect can be also obtained by laminating metal films of low resistance such as Al film or Mo film with a thickness of 0.1 to 0.5 μm, instead of the Ni film.

Thickness of the Cr oxide film 6*a* and thickness of the Ni film 6*c* in this embodiment are 0.02 to 0.07 μm and 0.1 to 0.5 μm, respectively, similarly to the case of the second embodiment.

Over this electrode film, a photoresist pattern is formed in the form of parallel strips spaced from each other in a direction of intersecting the transparent electrodes 2 at right angles, similarly to the embodiments described previously. After etching the Ni metal film with a mixture liquid of phosphoric acid: nitric acid (2:1) and rinsing, the Cr oxide film 6*a* is etched continuously with a mixture liquid of cerium diammonium nitrate: perchloric acid (3:1) to turn to the rear electrode 6. By using the photoresist pattern in the patterning of the Cr oxide film 6*a* without removing it after etching the Ni metal film 6*c*, the manufacturing process can be simplified.

With the EL device of this embodiment, because the Ni metal film 6*c* and the $Cr_2O_{3-x}$ film 6*a*, an oxide film of Cr, are used as the rear electrodes 6 which makes it easier to control the degree of oxidization than forming an Al oxide film, light absorbing effect was easily obtained. Also a contrast ratio of 50:1 or higher was obtained right below an illumination of 500 lx.

Also the sheet resistivity of the rear electrodes 6 was reduced to 0.5 Ω/□ or less, thus reducing unevenness of display.

(Fourth embodiment)

The fourth embodiment of the invention will now be described below with reference to FIG. 4.

Figure 4:
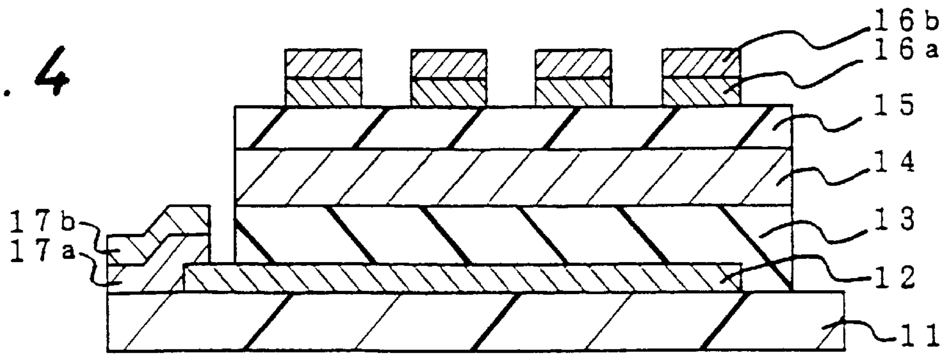
FIG. 4 is a view showing a fourth embodiment of the invention.

FIG. 4 shows a cross sectional view of the EL device of the invention. Reference numeral 11 denotes a transparent substrate, reference numeral 12 a transparent electrode, reference numeral 13 a first insulation film, reference numeral 14 a luminescent layer, reference numeral 15 a second insulation film, reference numeral 16 rear electrodes and reference numeral 17 terminal electrodes. A method of manufacturing the EL device will be described below.

A pattern of parallel strips of transparent electrodes 12 spaced from each other made of ITO (indium tin oxide) is formed on a transparent substrate 11 made of glass or the like. A first insulation film 13 made of an oxide such as $Al_2O_3$, $SiO_2$ and $TiO_2$ or a nitride such as $Si_3N_4$ is formed over the transparent electrodes 12. Then a luminescent layer 14 having such a constitution as a trace of Mn or the like is added as a luminescence center to a base material comprising ZnS, ZnSe, SrS or the like, and a second insulation film 15 made of the oxide or the nitride are formed in this order over the first insulation film 13. Formed further over this is a Mo oxide ($MoO_{3-x}$) film 16*a* which serves as a light absorption film having a thickness of 0.02 to 0.07 μm. The Mo oxide film 16*a* is formed by sputtering a target of metal Mo with Ar gas including oxygen ($O_2$) mixed therein thereby to let Mo and O react, while the concentration of oxygen mixed in Ar gas is set to a level lower than the minimum oxygen concentration required for Mo to be completely oxidized and turn to $MoO_3$, so that part of Mo is oxidized in oxygen-deplete atmosphere and turns to $MoO_{3-x}$, Further over this layer, a metal Mo film 16*b* is formed with a thickness of 0.1 to 0.5 μm. Over this electrode film, a photoresist pattern for rear electrodes 16 and a photoresist pattern for terminal electrodes 17 are formed in a form of parallel strips spaced from each other in a direction intersecting the transparent electrodes 12 at right angles, similarly to that described previously. Then the Mo metal film 16*b* and the Mo oxide film 16*a* are etched with a mixture liquid of phosphoric acid: nitric acid or a mixture liquid of phosphoric acid: acetic acid to turn to the rear electrodes 16 and the terminal electrodes 17.

With the EL device of this embodiment, because the Mo metal film 16*b* and the $MoO_{3-x}$ film 16*a*, an oxide film of Mo, are used as the rear electrodes 16 which makes it easier to control the degree of oxidization than forming an Al oxide film, light absorbing effect was easily obtained.

(Fifth embodiment)

Figure 5:
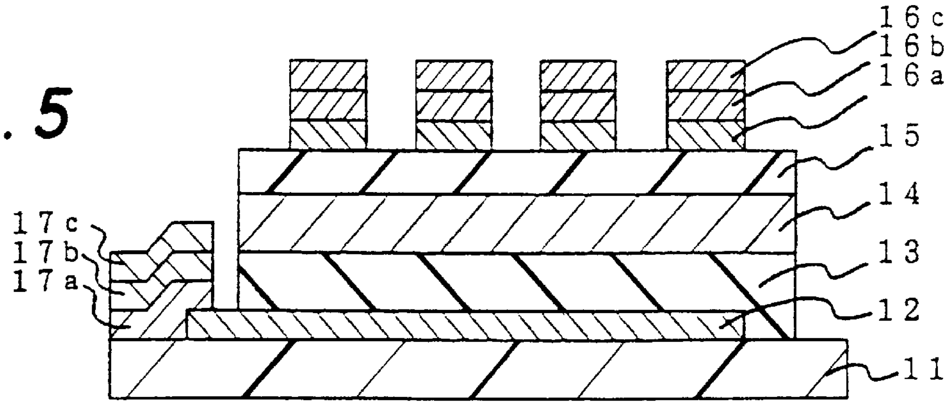
FIG. 5 is a view showing a fifth embodiment of the invention.

FIG. 5 shows the construction of the fifth embodiment of the invention, which is almost identical with the construction of the fourth embodiment, except for an Al film 16*c* of thickness from 0.1 to 0.5 μm provided over the Mo film 16*b* among the rear electrodes 16. This is for the purpose of reducing the resistance of the rear electrode because Mo has a high specific resistance of $5.6\times10^{-6}\Omega\cdot cm$.

Over this electrode film, a photoresist pattern is formed in the form of parallel strips spaced from each other in a direction of intersecting the transparent electrodes 12 at right angles, similarly to those described previously. After etching the Al metal film with, for example, a commercially available Al etchant (mixture liquid of phosphoric acid and acetic acid) and rinsing, a Mo metal film 16*b* and the Mo oxide film 16*a* are etched continuously to turn to the rear electrodes. By using the photoresist pattern in the patterning of the Mo metal film 16*b* and the Mo oxide film 16*a* without removing it after etching the Al metal film 16*c* as described above, the manufacturing process can be simplified.

While it is well known that the Al etchant is capable of etching Mo as well as Al, another etchant may also be used to form the similar pattern by continuously etching Al and Mo with different etchants.

With the EL device of this embodiment, because the Mo metal film 16*b* and the $MoO_{3-x}$ film 16*a*, an oxide film of Mo, are used as the rear electrodes 16 which makes it easier to control the degree of oxidization than forming an Al oxide film, light absorbing effect was easily obtained.

Also because the Al metal film 16*c* is further laminated on the Mo metal film 16*b*, the sheet resistivity of the rear electrode 16 is reduced to 0.5 Ω/□ or less, thus reducing unevenness of display.

(Sixth embodiment)

Figure 6:
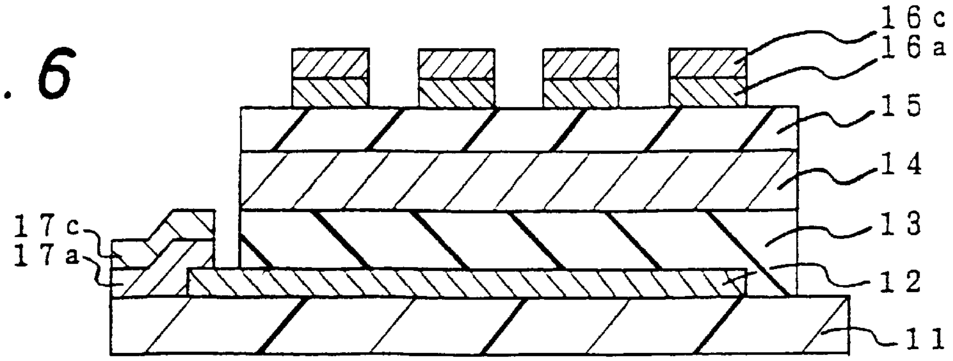
FIG. 6 is a view showing a sixth embodiment of the invention.
Figure 7:
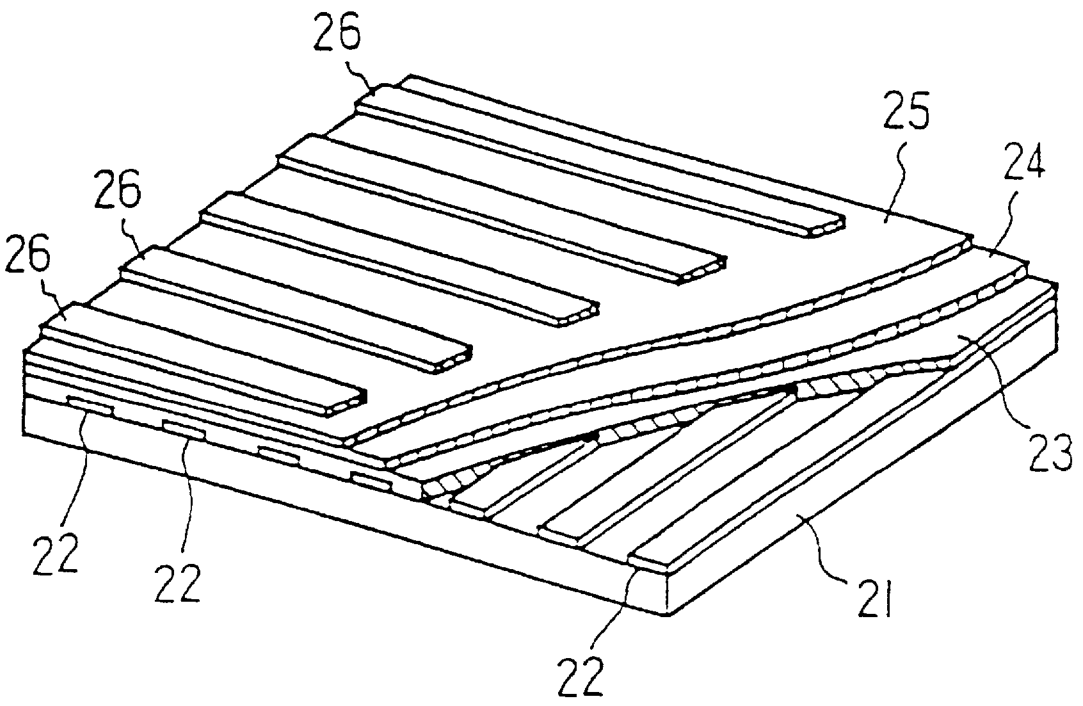
FIG. 7 is a view showing a construction of an EL device of 3-layer structure.
Figure 8:
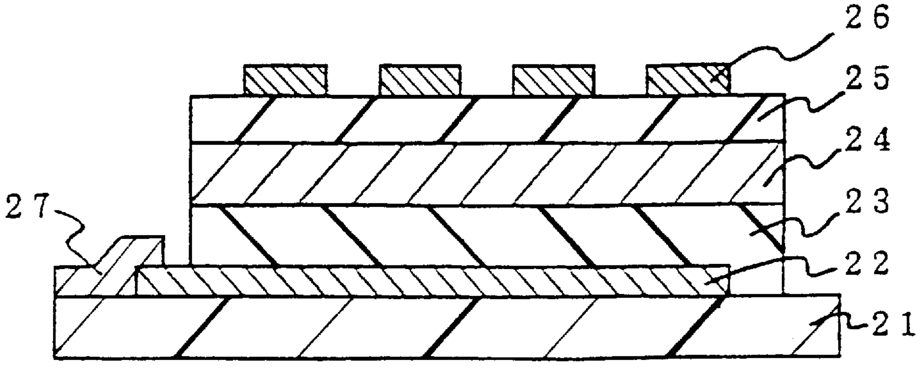
FIG. 8 PRIOR ART
FIG. 8 is a view showing a cross sectional view of an EL device of a prior art.
Figure 9:
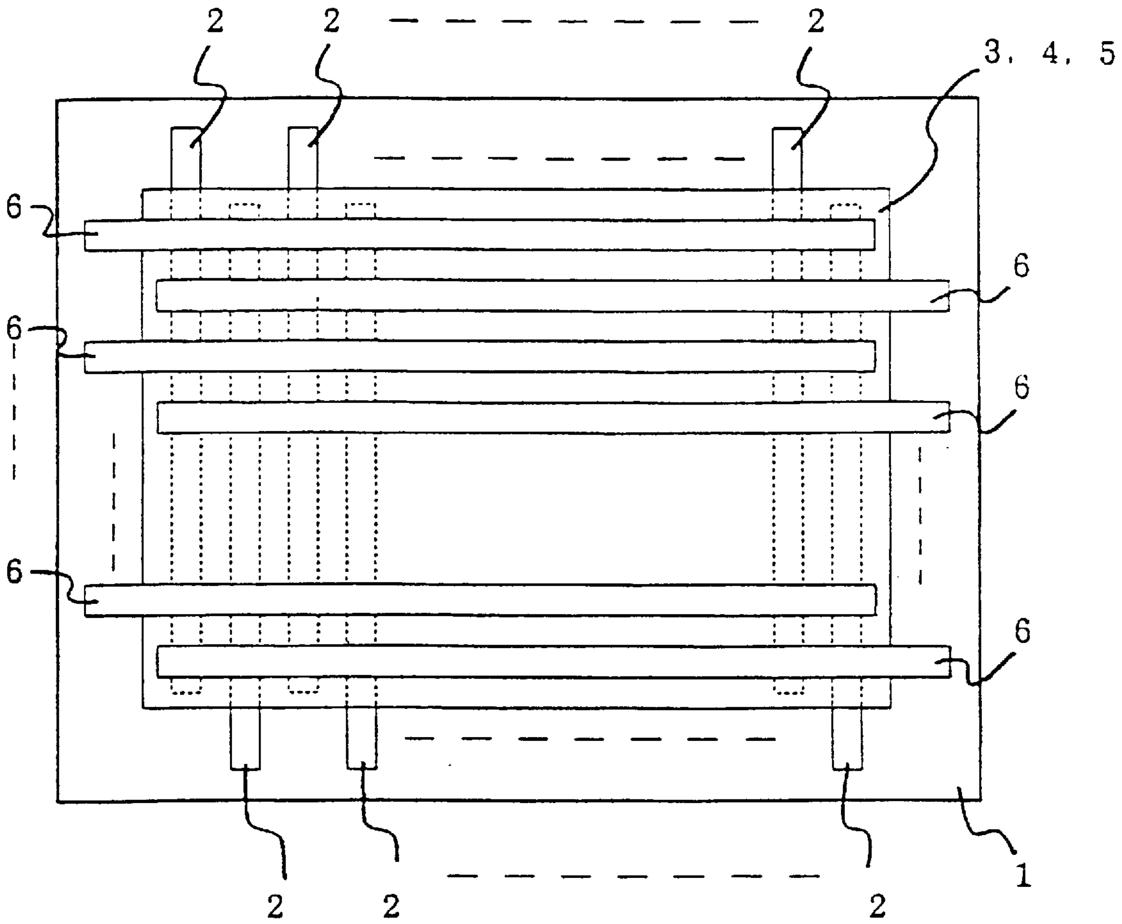
FIG. 9 is a view showing an example of leading out rear electrodes of an EL device.
Figure 10:
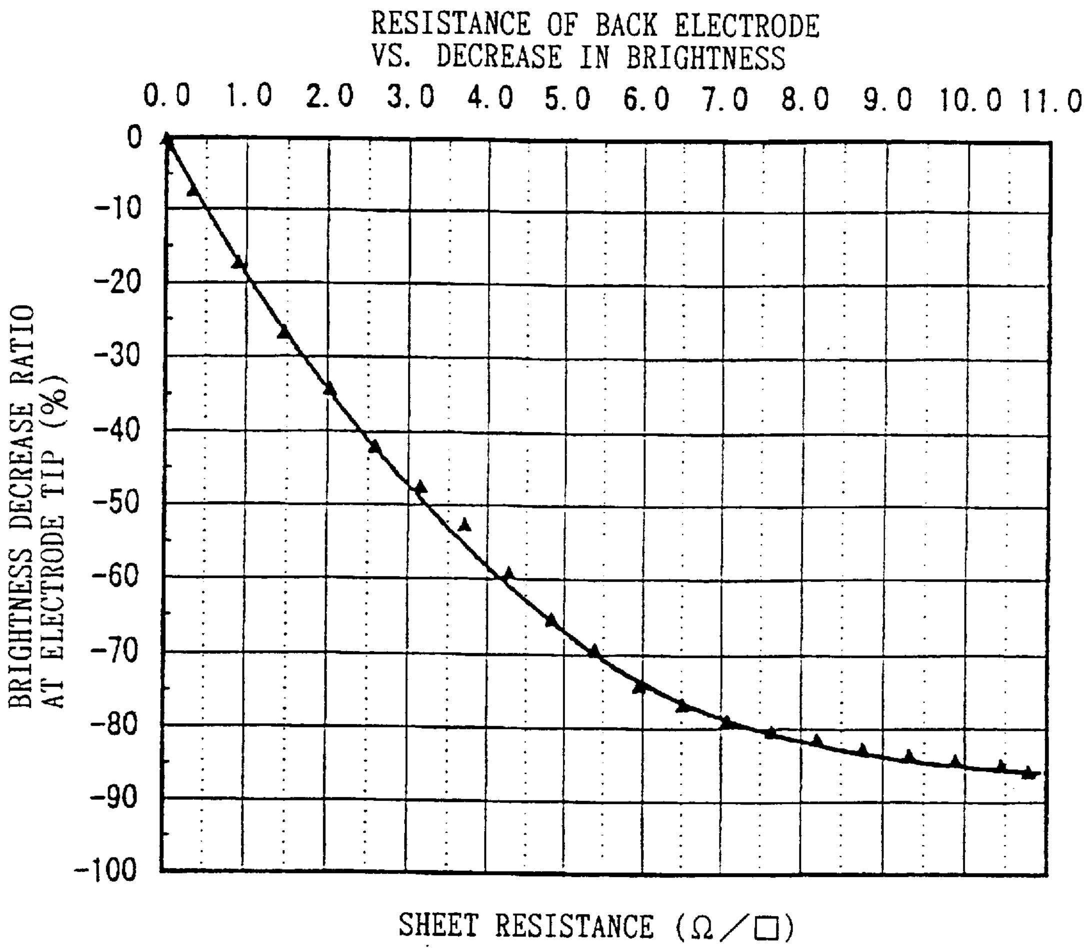
FIG. 10 is a view showing a relationship between the electric resistance of the rear electrode and the difference in luminance between the base and tip of the electrode.

FIG. 6 shows the construction of the sixth embodiment of the invention, which is almost identical with the construction of the fifth embodiment, except that the Mo metal film 16*b* among the rear electrodes 16 is omitted and an Al metal film 16*b* is formed directly on the Mo oxide film 16*a*.

Thickness of the Mo oxide film 16*a* and thickness of the Al metal film 16*c* in this embodiment are 0.02 to 0.07 μm and 0.1 to 0.5 μm, respectively, similarly to the case of the fifth embodiment. Over this electrode film, a photoresist pattern is formed in the form of parallel strips spaced from each other in a direction of intersecting the transparent electrodes 12 at right angles, similarly to the embodiments described previously. After etching the Al metal film with, for example, a commercially available Al etchant (mixture liquid of phosphoric acid and acetic acid) and rinsing, the Mo oxide film 16*a* is etched continuously to turn to the back electrode. By using the photoresist pattern in the patterning of the Mo oxide film 16*a* without removing it after etching the Al metal film 16*c*, the manufacturing process can be simplified.

Also in this embodiment, while it is well known that Al etchant is capable of etching Mo as well as Al, another etchant may also be used to form the similar pattern by continuously etching Al and Mo with different etchants.

With the EL device manufactured as described above, because the $MoO_{3-x}$ film 16*a*, an oxide film of Mo, and the Al metal film 16*c* are used as the rear electrodes 16 which makes it easier to control the degree of oxidization than forming an Al oxide film, light absorbing effect was easily obtained.

Also because the Al metal film 16*c* is further laminated on the Mo oxide film 16*a*, the sheet resistivity of the rear electrode 16 was reduced to 0.5 Ω/□ or less, thus reducing unevenness of display.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electroluminescence device which emits light by applying a predetermined-level voltage, the device comprising:

transparent electrodes, rear electrodes, and a luminescent layer to which the predetermined-level voltage is applied, interposed between the transparent electrodes and the rear electrodes, wherein as the rear electrode is used a laminated film composed of a Cr oxide film and a Cr metal film which are laminated in this order from the luminescent layer side.

2. The electroluminescence device of claim 1, wherein a metal film of Al, Ni, Mo or the like having a lower electric resistance than that of the Cr metal film is further laminated on the Cr metal film used as the rear electrode to reduce the sheet resistivity of the rear electrode to 0.5 Ω/□ or less.

3. An electroluminescence device which emits light by applying a predetermined-level voltage, the device comprising:

transparent electrodes, rear electrodes, and a luminescent layer to which the predetermined-level voltage is applied, interposed between the transparent electrodes and the rear electrodes, wherein as the rear electrode is used a laminated film composed of a Cr oxide film and a metal film of Al, Ni, Mo or the like which are laminated in this order from the luminescent layer side.

4. An electroluminescence device which emits light by applying a predetermined-level voltage, the device comprising:

transparent electrodes, rear electrodes, and a luminescent layer to which the predetermined-level voltage is applied, interposed between the transparent electrodes and the rear electrodes, wherein as the rear electrode is used a laminated film composed of a Mo oxide film and a metal film of Mo which are laminated in this order from the luminescent layer side.

5. The electroluminescence device of claim 4, wherein a metal film of Al or the like having a lower electric resistance than that of the metal film of Mo is further laminated on the metal film of Mo used as the rear electrode to reduce the sheet resistivity of the rear electrode to 0.5 Ω/□ or less.

6. An electroluminescence device which emits light by applying a predetermined-level voltage, the device comprising:

transparent electrodes, rear electrodes, and a luminescent layer to which the predetermined-level voltage is applied, interposed between the transparent electrodes and the rear electrodes, wherein as the rear electrode is used a laminated film composed of a Mo oxide film and a metal film of Al or the like which are laminated in this order from the luminescent layer side.

7. A method of manufacturing the electroluminescence device of claim 2, the method comprising the steps of:

forming a first insulation film, an EL layer and a second insulation film on a transparent substrate;

forming a metal oxide film made of an oxide of Cr or Mo on the second insulation film;

forming a first metal film made of Cr or Mo on the metal oxide film;

forming a second metal film made of Al, Ni, Mo or the like on the first metal film;

spreading a resist on the second metal film to form a pattern of the resist;

patterning the second metal film by using the resist pattern; and patterning the first metal film and the metal oxide film by similarly using the resist pattern.

8. A method of manufacturing the electroluminescence device of claim 3, the method comprising the steps of:

forming a first insulation film, an EL layer and a second insulation film on a transparent substrate;

forming a metal oxide film made of an oxide of Cr or Mo on the second insulation film;

forming a metal film made of Al, Ni, Mo or the like on the metal oxide film;

spreading a resist on the metal film to form a pattern of the resist;

patterning the metal film by using the resist pattern; and patterning the metal oxide film by similarly using the resist pattern.

9. The electroluminescence device of claim 1, wherein the laminated film of the rear electrode consists of one Cr oxide film and one Cr metal film.

10. The electroluminescence device of claim 3, wherein the laminated film of the rear electrode consists of one Cr oxide film and one metal film selected from the group consisting of an Al metal film, a Ni metal film or a Mo metal film.

11. The electroluminescence device of claim 4, wherein the laminated film of the rear electrode consists of one Mo oxide film and one Mo metal film.

12. The electroluminescence device of claim 6, wherein the laminated film of the rear electrode consists of one Mo oxide film and one Al metal film.

* * * * *